Patented Mar. 31, 1931

1,798,133

UNITED STATES PATENT OFFICE

SIDNEY M. CADWELL, OF LEONIA, AND LUDWIG MEUSER, OF BERGENFIELD, NEW JERSEY, ASSIGNORS TO THE NAUGATUCK CHEMICAL COMPANY, OF NAUGATUCK, CONNECTICUT, A CORPORATION OF CONNECTICUT

PROCESS FOR TREATING RUBBER AND PRODUCT OBTAINED THEREBY

No Drawing.   Application filed July 30, 1927.   Serial No. 209,638.

This invention relates to the treatment of rubber with materials which retard cracking of the rubber under tension in sunlight or under other circumstances in which the light effect upon rubber is similar to that of direct sunlight.

This kind of depreciation in rubber goods is encountered in practically all instances where the rubber during its service is exposed to light, and particularly sunlight. It has been the practice to incorporate with some rubber compositions materials which retard the cracking. Notable among the materials heretofore used is paraffine, but the use of this substance is limited because of the fact that paraffine blooms out of uncured rubber stocks thus reducing the surface stickiness of the rubber and causing difficulty in the fabrication of articles. Another disadvantage attending the use of paraffine and similar materials is that they bloom out or sweat out of vulcanized rubber compositions thus spoiling the appearance of the rubber articles.

Many of the chemicals in the present invention are accelerators, and many do not bloom out of the rubber. They also show an advantage even in the presence of paraffine.

The invention consists in incorporating a sulfoxide with the rubber to retard cracking of the rubber in sunlight. More particularly the invention consists in treating rubber with a sulfoxide to retard cracking of the rubber under the influence of light rays and to exert a beneficial effect on other physical properties of vulcanized rubber.

The invention may be illustrated by the following example:—100 parts of rubber, 10 parts of zinc oxide, 3 parts of sulphur, ¾ part of a formaldehyde ethyl amine condensation product containing stearic acid and 5 parts of diphenyl sulfoxide are mixed on the mill in the usual way and vulcanized for 60 min. at 40 lb. steam pressure. This stock will show considerable less cracking in sunlight than a similar stock containing no sulfoxide. A convenient method of testing is as follows: A strip of the sulfoxide stock is bent double, and the bent portion exposed to direct rays of the sun. A similar stock containing no sulfoxide may be placed beside the sulfoxide stock. It will be observed that the sulfoxide stock shows fewer and less severe cracks than the control in the same length of time. It is desirable to bend the stocks, since this places the rubber under tension and accelerates the rate of cracking. The amount of cracking is of course most marked in powerful sunlight.

Instead of mixing the sulfoxide with a rubber stock on the mill, the sulfoxide may be introduced after vulcanization by painting, dipping, etc., or in any other suitable manner. And the sulfoxides may be used for the purpose of the present invention in quantities ranging from 1 to 5 parts or greater. The accelerating value of these compounds is approximately equal to that of aniline and they may be used in the presence of the more powerful accelerators with beneficial results, such as increased tensile strength.

Instead of diphenyl sulfoxide, any of the following may be employed: di para tolyl sulfoxide, dibenzyl sulfoxide, dinormal butyl sulfoxide, dibenzyl disulfoxide. The class of materials comprehends the sulfoxides, and the organic groups may be alike or unlike, aryl, alkyl, or mixed aryl and alkyl. For convenience, these materials may be described as comprising the group

where R represents alkyl or aryl and R' represents alkyl or aryl, and in the case of the disulfoxides, the group,

linked to alkyl or aryl.

The invention may be applied generally to all rubber goods which in service are exposed to the continued action of sunlight or light having a similar effect upon rubber whereby the surface shows cracks or fissures. Among the types of rubber goods are footwear, druggists' sundries, tubes, etc. As previously stated, the sulfoxides may, if desired, be used in conjunction with other accelerators, i. e., in rubber stocks which are designated in the claims as "vulcanizable."

Having thus described our invention, what we claim and desire to protect by Letters Patent is:

1. A method of retarding the sun cracking of rubber which comprises mixing a diaryl sulfoxide into a vulcanizable rubber composition, and vulcanizing the rubber.

2. A method of retarding the sun cracking of rubber which comprises mixing diphenyl sulfoxide into a vulcanizable rubber composition, and vulcanizing the rubber.

3. Vulcanized rubber derived from rubber containing a diaryl sulfoxide.

4. Vulcanized rubber derived from rubber containing a diphenyl sulfoxide.

5. A method of retarding the sun cracking of rubber which comprises introducing into a vulcanizable rubber composition, a compound having the general formula $$\overset{RSR'}{\underset{O}{\|}}$$

where R represents alkyl, aryl, or aralkyl, and R' represents alkyl, aryl, aralkyl or $$\overset{S}{\underset{O}{\|}}$$

linked to alkyl, aryl or aralkyl.

6. A method of retarding the sun cracking of rubber which comprises introducing into a vulcanizable rubber composition, a compound having the general formula $$\overset{RSR'}{\underset{O}{\|}}$$

where R represents alkl, aryl, or aralkyl, and R' represents alkyl, aryl, aralkyl or $$\overset{S}{\underset{O}{\|}}$$

linked to alkyl, aryl or aralkyl, and vulcanizing the rubber.

7. A method of retarding the sun cracking of rubber which comprises introducing into a vulcanizable rubber composition a compound having the general formula $$\overset{RSR'}{\underset{O}{\|}}$$

where R and R' represent alkyl, aryl or aralkyl.

8. A method of retarding the sun cracking of rubber which comprises introducing into a vulcanizable rubber composition a compound having the general formula $$\overset{RSR'}{\underset{O}{\|}}$$

where R and R' represent alkyl, aryl or aralkyl, and vulcanizing the rubber.

9. Vulcanized rubber derived from rubber containing a compound having the general formula $$\overset{RSR'}{\underset{O}{\|}}$$

where R represents alkyl, aryl, or aralkyl, and R' represents alkyl, aryl, aralkyl, or $$\overset{S}{\underset{O}{\|}}$$

linked to alkyl, aryl or aralkyl.

10. Vulcanized rubber derived from rubber containing a compound having the general formula $$\overset{RSR'}{\underset{O}{\|}}$$

where R and R' represent alkyl, aryl or aralkyl.

Signed at New York, county of New York, State of New York, this 18th day of July, 1927.

SIDNEY M. CADWELL.

Signed at New York, county of New York, State of New York, this 27th day of July, 1927.

LUDWIG MEUSER.